United States Patent
Lang et al.

(10) Patent No.: US 6,901,742 B1
(45) Date of Patent: Jun. 7, 2005

(54) METHOD FOR DETECTING THE STATE OF A CATALYTIC CONVERTER SYSTEM

(75) Inventors: Axel Lang, Wolfenbüttel (DE); Axel Wachtendorf, Hude (DE); Uwe Kammann, Warberg (DE); Harald Loeck, Wolfsburg (DE); Rudolf Krebs, Wendeburg (DE); Michael Daetz, Tiddische (DE); Frank Michael Wittig, Braunschweig (DE); Axel König, Wolfsburg (DE)

(73) Assignee: Volkswagen AG, (DE)

( * ) Notice: Subject to any disclaimer, the term of this patent is extended or adjusted under 35 U.S.C. 154(b) by 55 days.

(21) Appl. No.: 10/030,784

(22) PCT Filed: Jun. 23, 2000

(86) PCT No.: PCT/EP00/05821

§ 371 (c)(1), (2), (4) Date: Feb. 12, 2002

(87) PCT Pub. No.: WO01/06223

PCT Pub. Date: Jan. 25, 2001

(30) Foreign Application Priority Data

Jul. 16, 1999 (DE) ................................ 199 32 715

(51) Int. Cl.⁷ ................................................ F01N 3/00
(52) U.S. Cl. ............................ 60/277; 60/274; 60/276; 60/285
(58) Field of Search ........................ 60/274, 276, 277, 60/285, 301

(56) References Cited

U.S. PATENT DOCUMENTS

| | | | |
|---|---|---|---|
| 5,088,281 A | 2/1992 | Izutani et al. | |
| 5,341,642 A | 8/1994 | Kurihara et al. | |
| 5,400,592 A * | 3/1995 | Mukaihira et al. | 60/274 |
| 5,526,643 A * | 6/1996 | Mukaihira et al. | 60/277 |
| 5,595,061 A | 1/1997 | Toyoda | |
| 5,722,236 A * | 3/1998 | Cullen et al. | 60/274 |
| 5,724,809 A * | 3/1998 | Mitsutani et al. | 60/276 |
| 5,746,049 A * | 5/1998 | Cullen et al. | 60/274 |
| 5,842,341 A * | 12/1998 | Kibe | 60/274 |
| 5,845,489 A | 12/1998 | Dohta et al. | |
| 5,884,476 A * | 3/1999 | Hirota et al. | 60/278 |
| 5,916,130 A | 6/1999 | Nakae et al. | |
| 5,966,930 A | 10/1999 | Hatano et al. | |
| 6,082,101 A | 7/2000 | Manaka et al. | |
| 6,199,374 B1 * | 3/2001 | Hirota et al. | 60/277 |
| 6,513,322 B2 * | 2/2003 | Ohuchi et al. | 60/285 |

FOREIGN PATENT DOCUMENTS

DE    42 43 339    6/1993

(Continued)

*Primary Examiner*—Binh Q. Tran
(74) *Attorney, Agent, or Firm*—Ostrolenk, Faber Gerb & Soffen, LLP

(57) ABSTRACT

A process for detecting a state of a catalyst system installed in an exhaust gas channel of an internal combustion engine of a motor vehicle, through which catalyst system exhaust gas from the internal combustion engine flows so that the exhaust gas can be purified, the process including the steps of: detecting at least one operating parameter of the catalyst system over a predetermined time period, determining a total energy output of the internal combustion engine within the predetermined time period, and calculating a characteristic value (k) based on a ratio of the at least one operating parameter to the total energy output.

11 Claims, 1 Drawing Sheet

FOREIGN PATENT DOCUMENTS

| | | |
|---|---|---|
| DE | 195 27 774 | 2/1996 |
| DE | 196 46 008 | 5/1997 |
| DE | 197 32 167 | 1/1998 |

* cited by examiner though such severe damage is not actually present. As a result of this incorrect diagnosis, it is possible under certain conditions for unnecessary regeneration or maintenance procedures to be initiated.

METHOD FOR DETECTING THE STATE OF A CATALYTIC CONVERTER SYSTEM

PRIORITY CLAIM

This is a U.S. national stage of application No. PCT/EP00/05821, filed on Jun. 23, 2000. Priority is claimed on that application and on the following application:
Country: Germany, Application No.: 199 32 715.7, filed Jul. 16, 1999.

BACKGROUND OF THE INVENTION

The invention pertains to a process for detecting the state of a catalyst system in an exhaust gas channel of an internal combustion engine of a motor vehicle.

It is known that catalysts, especially so-called 3-way catalysts, can be placed in the exhaust gas channel to purify the exhaust gas of the internal combustion engine. When an air-fuel mixture undergoes combustion, pollutants such as soot particles, nitrogen oxides ($NO_x$), carbon monoxide (CO), and incompletely burned hydrocarbons (HCs) are formed in varying proportions. Reducing agents, i.e., CO, HCs, and $H_2$, are oxidized on the catalysts with oxygen and/or nitrogen oxides to form water and carbon dioxide. Oxidizing agents such as $NO_x$, however, are reduced on the catalysts with the help of reducing agents to form nitrogen.

It is also known that sensors can be assigned to a catalyst system of this type to detect, for example, the percentage of a certain gas component in the exhaust gas (lambda probes, $NO_x$ sensors) or to measure a temperature (temperature sensors). The way in which such sensors function and their location in the catalyst system are known.

During the dynamic operation of an internal combustion engine, the conversion rate for the pollutants deteriorates over the course of time as a result of reversible and irreversible damage to the catalysts. It is therefore known that sensors can be used to detect the degree of damage to the catalyst system, in that, for example, an $NO_x$ emission downstream of the catalyst system is compared with an $NO_x$ emission upstream of the catalyst system. To correct reversible damage, appropriate countermeasures are then usually initiated such as the regeneration of the catalyst in a reductive atmosphere. When the irreversible damage exceeds a predetermined threshold, it will be necessary under certain conditions to perform expensive maintenance work.

The disadvantage of the known processes is that, during the dynamic operation of the internal combustion engine, especially during acceleration phases, the variables on which the detection of the state of the catalyst system is based fluctuate widely. Thus, during periods of high engine power demand, the $NO_x$ emissions also increase. Thereafter, it is possible for the threshold values for the degree of damage to the catalyst system to be exceeded briefly, even though such severe damage is not actually present. As a result of this incorrect diagnosis, it is possible under certain conditions for unnecessary regeneration or maintenance procedures to be initiated.

SUMMARY OF THE INVENTION

The task of the present invention is to provide a way of detecting the state of the catalyst system independently of the dynamic operation of the engine (driving cycle).

This task is accomplished according to the invention by the process for detecting the state of the catalyst system in that:

(a) at least one operating parameter of the catalyst system is detected over a predetermined time period;

(b) the total energy output of the internal combustion engine within the predetermined time period is determined; and (c) a characteristic value k is calculated on the basis of a ratio of the at least one operating parameter to the total energy output. It is thus possible in an advantageous manner to take into account the dynamic behavior of the engine with respect to the emission of pollutants.

To compensate for statistical outliers, it is advantageous to form an average characteristic value from a predetermined number of characteristic values. As a function of the characteristic value or the average characteristic value, a maintenance signal can then be generated when, for example, a predetermined threshold value is exceeded.

The total energy output of the internal combustion engine can be detected in a manner known in and of itself by the use of suitable sensors and made available by an engine control unit as a measurement signal. To the same end, however, it is also possible to detect variables which are equivalent to the power output such as in particular a cumulative quantity of air. It has been found that a change in the total energy output is associated with a proportional change in selected operating parameters of the catalyst system.

The operating parameters of the catalyst system which are especially suitable include the catalyst temperature and the amount of HCs, CO, $O_2$, or $NO_x$ in the exhaust gas. These operating parameters can be detected as HCs, CO, $O_2$, or NO concentrations by known means with the use of sensors (lambda probes, $NO_x$ sensors) installed in the catalyst system and obtained on the basis of calculated or measured volume flow rates. In the process according to the invention, it is sufficient, for example, to determine the amount of $NO_x$ by means of an $NO_x$ sensor installed downstream of the catalyst.

In a preferred embodiment of the process, the state of the catalyst system is detected within an acceleration phase of the motor vehicle. In addition, the detection of the state can also be made to depend on whether or not the operating mode of the internal combustion engine is within a predetermined lambda region or on whether the catalyst temperature is in a predetermined temperature range.

BRIEF DESCRIPTION OF THE DRAWINGS

The invention is explained in greater detail below on the basis of the associated drawings.

DETAILED DESCRIPTION OF THE PREFERRED EMBODIMENTS

Figure 1:
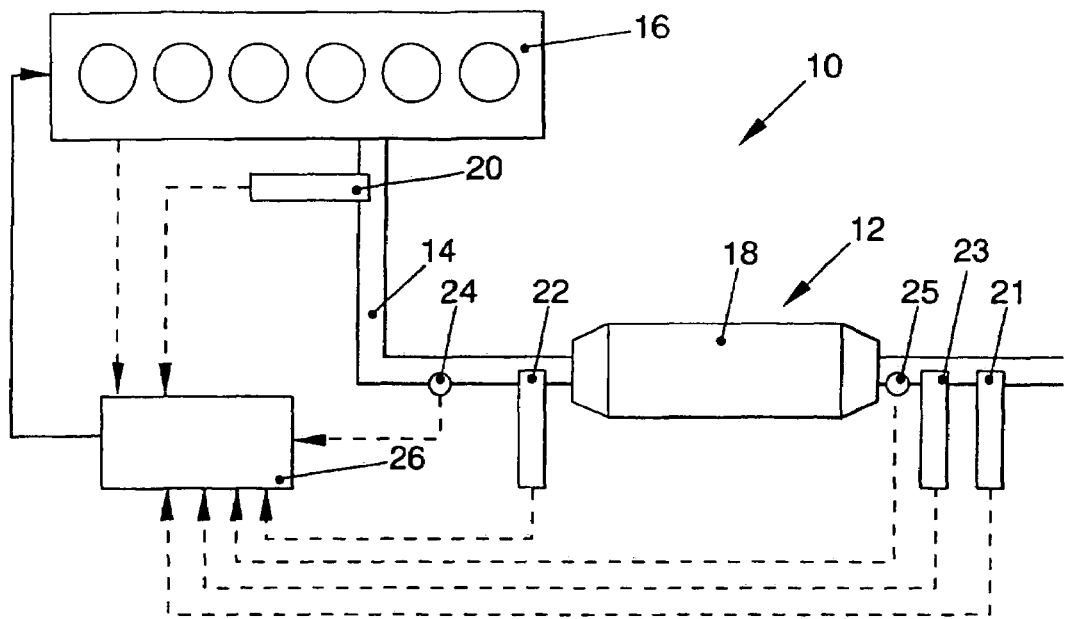
FIG. 1 is a schematic diagram of a catalyst system installation in an exhaust gas channel of an internal combustion engine.

FIG. 1 is a schematic diagram of the installation 10 of a catalyst system 12 in an exhaust gas channel 14 of an internal combustion engine 16, in particular a λ-controlled, Otto DI engine. The catalyst system 12 comprises at least one catalyst 18, especially a 3-way catalyst, through which exhaust gas from the internal combustion engine 16 flows. In addition, sensors can also be assigned to the catalyst system 12, which sensors make it possible to detect operating parameters of the catalyst system 12. For example, temperature sensors 24, 25 can be used to detect the exhaust gas temperature or the catalyst temperature. It is also possible to determine the percentages of selected gas components in the exhaust gas by the use of gas sensors. Thus, for example, lambda probes 20, 21 or $NO_x$ sensors 22, 23 can be installed in the exhaust gas channel 14 upstream and downstream of the catalyst 18. The sensors supply measurement data, which can be received and evaluated by an engine control unit 26. The operating mode of the internal combustion engine 16 can be characterized on the basis of a lambda value. Thus, a value of $\lambda>1$ characterizes operation under lean conditions, whereas $\lambda<1$ characterizes operation under rich conditions.

During the combustion process of an air-fuel mixture in the internal combustion engine 16, pollutants are formed in varying proportions, which are converted in the catalyst 18 in the course of a conversion reaction. Thus, for example, NO is reduced, and CO and HCs are oxidized. The extent to which the conversion reaction takes places in the catalyst 18 can be derived from a conversion rate. This can be determined, for example, by a comparison of a $NO_x$ value upstream with an $NO_x$ value downstream of the catalyst 18 (by the use of the $NO_x$ sensors 22, 23). The upstream and downstream lambda values of the exhaust gas detected by the lambda probes 20, 21 can be used in a similar manner. The process according to the invention, however, also makes it possible to diagnose the catalyst 18 with the use of only one $NO_x$ sensor 23 installed downstream of the catalyst 18.

If the conversion rate of the catalyst 18 is low, then reversible or irreversible damage to the catalyst can be present. Reversible damage includes, for example, sulfur poisoning, a coating of soot, or the oxidation of the catalyst components. Suitable regeneration measures may be able to repair reversible damage of this kind.

In contrast, irreversible damage, such as that caused by corrosive processes, leads to a permanent decrease in the conversion rate, and when they exceed a certain level must therefore be corrected by maintenance measures.

In the process according to the invention, the operating parameters of the catalyst system 12 are detected by means of the sensors and/or calculated on the basis of suitable models in the known manner. In addition, selected operating parameters of the internal combustion engine 16 are also determined by known means. Thus, a total energy output of the internal combustion engine 16 is acquired over a predetermined period of time. Because the ratio of the at least one operating parameter of the catalyst system 12 to the total energy output behaves in a proportional manner, it is possible to detect the state of the catalyst 18 independently of the engine power by calculating a characteristic value k which reflects this ratio.

Figure 2:
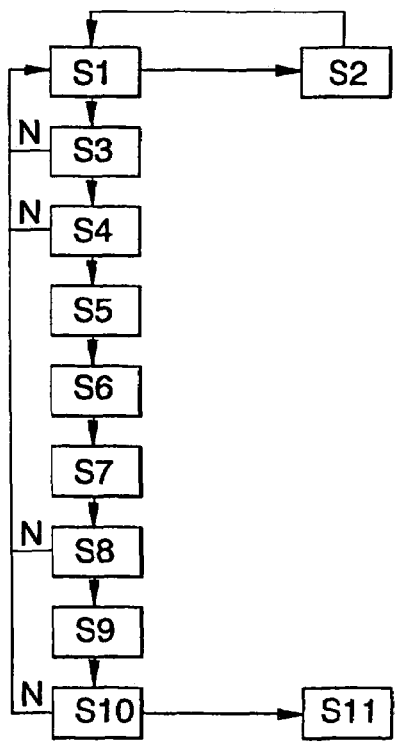
FIG. 2 shows a flow diagram of the detection of the state of the catalyst system according to an exemplary embodiment of the process according to the invention.

FIG. 2 is a flow diagram of the detection of the state of the catalyst system 12 according to the process of the invention in an exemplary embodiment. First, it is determined in step S1 whether or not the internal combustion engine 16 of the motor vehicle is just then in an acceleration phase, for it has been found to be especially advantageous to perform the detection of state procedure during this type of operating phase of the internal combustion engine 16. If an acceleration phase is not present, termination occurs in step S2, which can then be followed in turn by step S1 again.

If the vehicle is in an acceleration phase, it is then determined in step S3 whether or not the catalyst temperature is in a predetermined temperature range. In addition, a lambda value of the exhaust gas must also be within a predetermined lambda range (step S4). If these two conditions are satisfied, the time period of the detection of state is fixed in step S5, and the number n of detection of state procedures is possibly defined also.

As previously explained, the operating parameter of the catalyst system 12 is detected in step S6 with the help of the existing sensors. For this purpose, especially the catalyst temperature and the mass of HCs, CO, $CO_2$, or $NO_x$ in the exhaust gas are suitable. In addition, the total energy output of the internal combustion engine 16 is also measured over the predetermined time period, either directly or alternatively on the basis of a power-equivalent variable such as a cumulative air quantity.

A ratio of the at least one operating parameter of the catalyst system 12 to the total energy output is used in step S7 to calculate a characteristic value k.

In the exemplary embodiment being discussed here, the determination of the characteristic value is repeated n times to compensate for statistical outliers (step S8), and in step S9, an average characteristic value $k_m$ is formed as the average value of the n characteristic values k. Then, in step S10, the average characteristic value $k_m$ is compared with a predetermined threshold value. If the average characteristic value $k_m$ exceeds the threshold value, it is then possible for a maintenance signal to be generated in step S11, which can be used, for example, for an on-board diagnosis procedure.

What is claimed is:

1. A process for detecting a state of a catalyst system installed in an exhaust gas channel of an internal combustion engine of a motor vehicle, through which catalyst system exhaust gas from the internal combustion engine flows so that the exhaust gas can be purified, the process comprising the steps of:

detecting at least one operating parameter of the catalyst system over a predetermined time period;

determining a total energy output of the internal combustion engine within the predetermined time period; and calculating a characteristic value (k) based on a ratio of the at least one operating parameter to the total energy output, and determining the state of the catalyst system based upon the characteristic value.

2. A process according to claim 1, further including forming an average characteristic value ($k_m$) from a predetermined number n of characteristic values (k).

3. A process according to claim 1, further including generating a maintenance signal as a function of the characteristic value (k).

4. A process according to claim 2, further including generating a maintenance signal as a function of the average characteristic value ($k_m$).

5. A process according to claim 3, wherein the maintenance signal generating step includes generating of a maintenance signal when the characteristic value exceeds a predetermined threshold.

6. A process according to claim 4, wherein the maintenance signal generating step includes generating of a maintenance when the average characteristic value exceeds a predetermined threshold value.

7. A process according to claim 1, wherein the step of determining the total energy output includes finding the total energy output based on a power-equivalent variable.

8. A process according to claim 7, wherein the total energy output is found based on a cumulative air quantity.

9. A process according to claim 1, wherein the at least one operating parameter of the catalyst system is a catalyst temperature or an amount of one of the group consisting of Hcs, CO, $O_2$, and $NO_x$ in the exhaust gas.

10. A process according to claim 1, wherein the predetermined time period occurs within an acceleration phase of the motor vehicle.

11. A process according to claim 1, wherein the process is conducted within at least one of a predetermined lambda region and a predetermined temperature range.

* * * * *